United States Patent

Bagepalli et al.

[11] Patent Number: 5,934,687
[45] Date of Patent: Aug. 10, 1999

[54] GAS-PATH LEAKAGE SEAL FOR A TURBINE

[75] Inventors: Bharat Sampathkumaran Bagepalli, Niskayuna; Mahmut Faruk Aksit, Troy, both of N.Y.; Thomas Raymond Farrell, Simpsonville, S.C.

[73] Assignee: General Electric Company, Schenectady, N.Y.

[21] Appl. No.: 08/888,823

[22] Filed: Jul. 7, 1997

[51] Int. Cl.⁶ .................................................. F16J 15/02
[52] U.S. Cl. .................. 277/637; 277/643; 277/644; 277/649; 277/651; 277/653
[58] Field of Search .................. 277/637, 640, 277/643, 644, 649, 651, 653

[56] References Cited

U.S. PATENT DOCUMENTS

| | | | |
|---|---|---|---|
| 2,249,127 | 7/1941 | Goetze | 277/653 |
| 2,687,909 | 8/1954 | Blackman et al. | 277/651 |
| 2,764,311 | 9/1956 | Blackman | 277/649 |
| 4,063,845 | 12/1977 | Allen | 277/643 |
| 5,125,796 | 6/1992 | Cromer | 277/637 |
| 5,509,669 | 4/1996 | Wolfe et al. | 277/167.5 |
| 5,586,773 | 12/1996 | Bagepalli | 277/167 |
| 5,607,167 | 3/1997 | Franckx | 277/649 |

OTHER PUBLICATIONS

Application entitled, "Gas–Path Leakage Seal For a Gas Turbine", filed Dec. 14, 1995, Serial No. 08/572,355.

*Primary Examiner*—Kenneth J. Dorner
*Assistant Examiner*—Marcus Dolce
*Attorney, Agent, or Firm*—Douglas E. Erickson; Marvin Snyder

[57] ABSTRACT

A gas-path leakage seal for generally sealing a gas-path leakage-gap between spaced-apart first and second members of a turbine (such as combustor casing segments of a gas turbine). The seal includes a flexible and generally imperforate metal sheet assemblage having opposing first and second surfaces and two opposing raised edges extending a generally identical distance above and below the surfaces. A first cloth layer assemblage has a thickness generally equal to the previously-defined identical distance and is superimposed on the first surface between the raised edges. A second cloth layer assemblage is generally identical to the first cloth layer assemblage and is superimposed on the second surface between the raised edges.

11 Claims, 2 Drawing Sheets

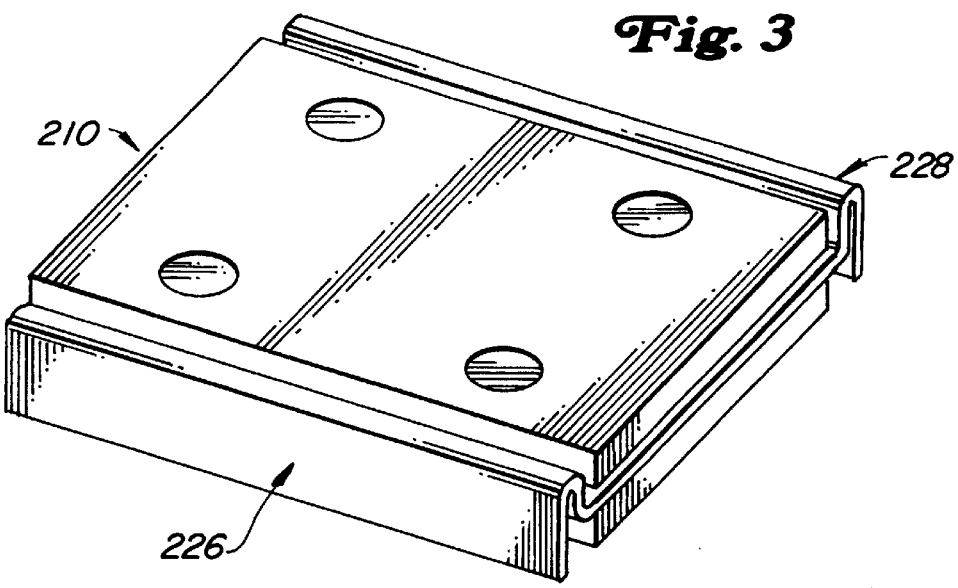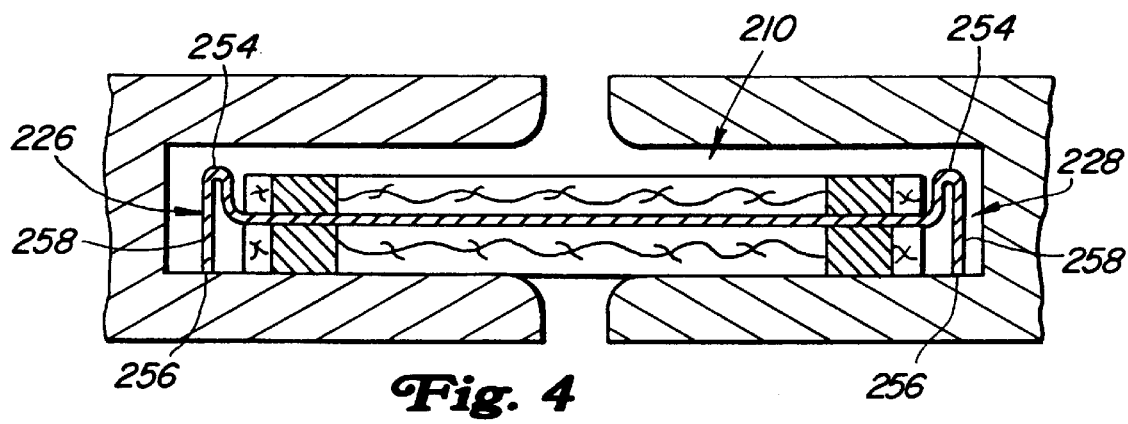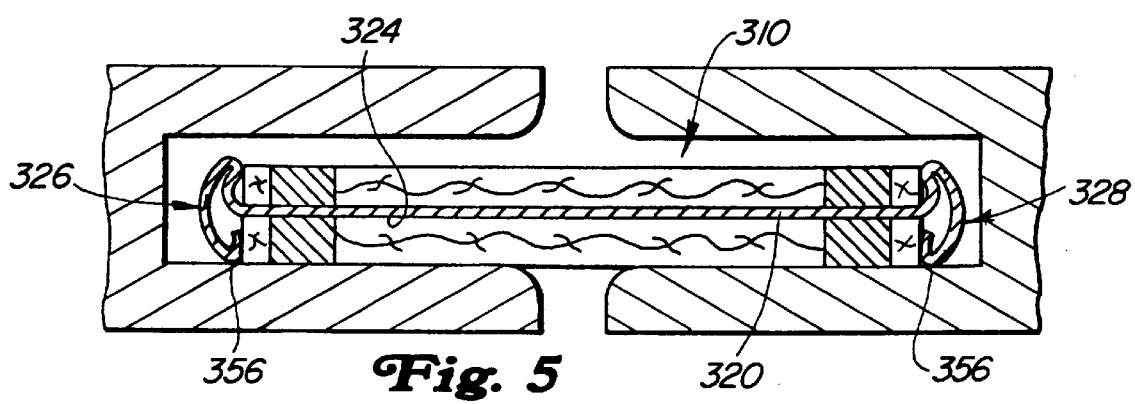

_US 5,934,687_

GAS-PATH LEAKAGE SEAL FOR A TURBINE

This invention was made with Government support under Government Contract No. DEFC21-95-MC31176 awarded by the Department of Energy. The Government has certain rights to this invention.

FIELD OF THE INVENTION

The present invention relates generally to turbines, and more particularly to a gas-path leakage seal for a turbine.

BACKGROUND OF THE INVENTION

Turbines include gas and steam turbines. Gas turbines include, but are not limited to, gas turbine power generation equipment and gas turbine aircraft engines. A gas turbine has a gas path which typically includes, in serial-flow relationship, an air intake (or inlet), a compressor, a combustor, a turbine, and a gas outlet (or exhaust nozzle). Gas leakage, either out of the gas path or into the gas path, from an area of higher pressure to an area of lower pressure is generally undesirable. For example, gas-path leakage in the turbine area of a gas turbine will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between gas turbine subassemblies such as through gaps between the combustor and the turbine, and gas-path leakage occurs through gaps between the components that make up a gas turbine subassembly, such as through gaps between combustor casing segments. Such components and subassemblies have surfaces of different shapes, suffer from assembly misalignment, and undergo vibration. Hot-section components thermally experience hot gas flow and typically undergo different thermal growths. U.S. Pat. No. 5,509,669 discloses a seal which includes a metal, ceramic, and/or polymer fiber-fabric cloth layer wrapped around a metal, ceramic, and/or polymer foil layer with the edge of the foil layer protruding beyond the foil layer and bent down to contact a gas turbine member which partially defines the leakage gap and/or with a weldment securing the seal to a gas turbine member which partially defines the leakage gap.

Steam turbines (which can be considered a special type of gas turbine) include, but are not limited to, steam turbine power generation equipment. A steam turbine includes a steam inlet, a turbine, and a steam outlet, wherein steam is the gas which turns the turbine rotor. The turbine of a steam turbine is similar to the turbine of a gas turbine and suffers from steam-path leakage the way the turbine of a gas turbine suffers from gas-path leakage.

What is needed is an improved gas-path leakage seal for a turbine which is easy to assemble and easy to install.

SUMMARY OF THE INVENTION

The gas-path leakage seal of the invention is for generally sealing a gas-path leakage-gap between spaced-apart first and second members of a turbine. The seal includes a flexible and generally imperforate metal sheet having opposing first and second surfaces and two opposing raised edges connecting together the first and second surfaces. Each of the raised edges extends a generally identical distance above the first surface, and each of the raised edges extends generally the aforesaid identical distance below the second surface. A first cloth layer has a thickness generally equal to the aforesaid identical distance and is superimposed on the first surface between the raised edges. A second cloth layer is separate from and generally identical to the first cloth layer and is superimposed on the second surface between the raised edges. Preferably, the first and second cloth layers and the metal sheet are attached together by spot welds, and the raised edges have curved portions.

Several benefits and advantages are derived from the invention. The metal sheet provides good sealing of gas flow as the raised edges are pushed against the first and second turbine members by gas from the higher-pressure side of the seal. The first and second cloth layers provide some sealing and good wear resistance. The flexible metal sheet and the inherent flexibility of the cloth layers provides good seal flexibility which means the seal is very compliant and can accommodate surfaces of different shapes, assembly misalignment, vibration, and differential thermal growth. The spot welds make it easier to assemble the seal, the curved portions make it easier to install the seal, and the two-way extending raised edges allow the seal to be installed right-side up or upside down.

DESCRIPTION OF THE DRAWINGS

FIG. 3 is view as in FIG. 1 but of a second preferred embodiment of the seal of the present invention;

FIG. 4 is a cross-sectional view taken along lines 4—4 of FIG. 3 with the seal shown installed in corresponding slots of two turbine members; and FIG. 5 is a view as in FIG. 4 but of a third preferred embodiment of the seal of the present invention.

DETAILED DESCRIPTION OF THE DRAWINGS

Figure 1:
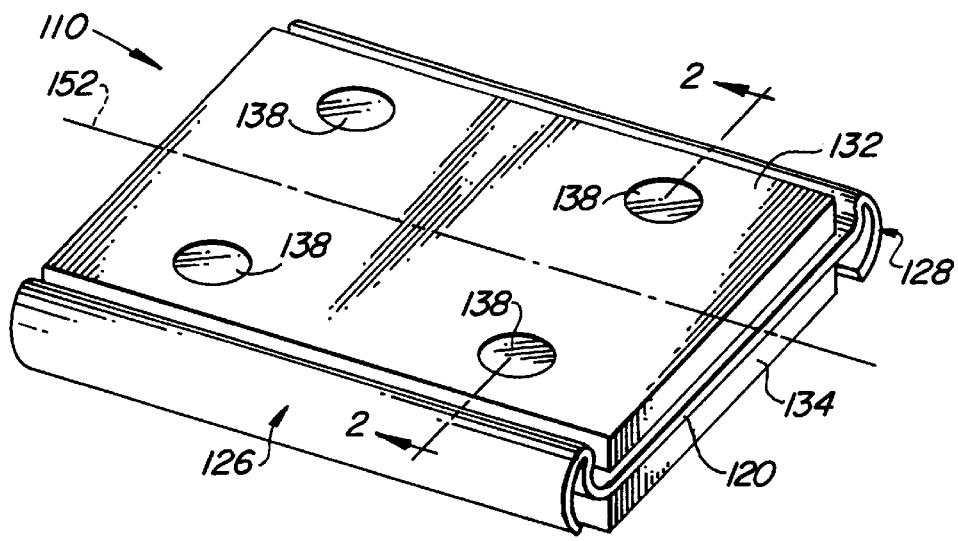
FIG. 1 is a schematic perspective view of a first preferred embodiment of the seal of the present invention.
Figure 2:
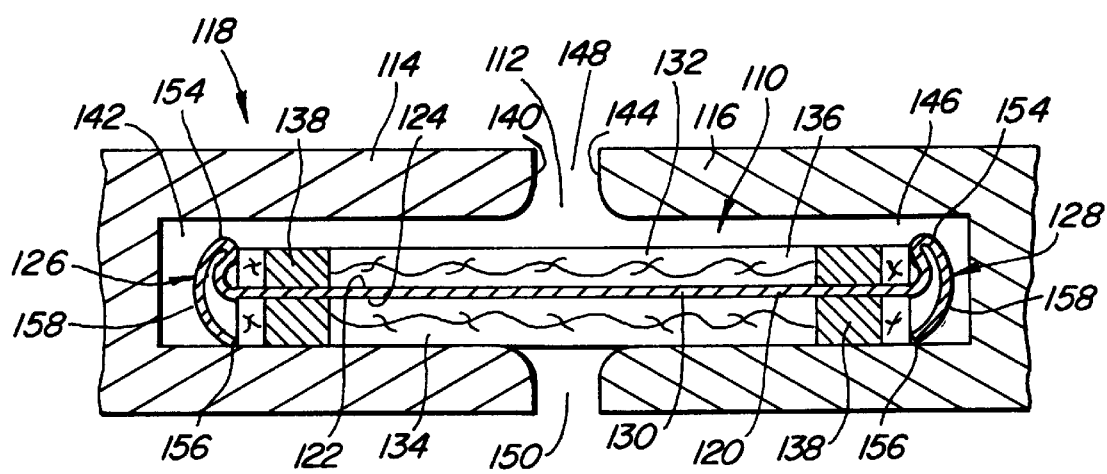
FIG. 2 is a cross-sectional view taken along lines 2—2 of FIG. 1 with the seal shown installed in corresponding slots of two turbine members.

Referring now to the drawings, wherein like numerals represent like elements throughout, FIGS. 1 and 2 schematically show a first preferred embodiment of the gas-path leakage seal 110 of the present invention. Although the invention is described in terms of a gas turbine, it is understood to be equally applicable to a steam turbine which can be considered a special type of gas turbine. The gas-path leakage seal 110 is for generally sealing a gas-path leakage-gap 112 between spaced-apart first and second members 14 and 16 of a gas turbine 18 (only a small portion of which is shown in FIG. 2). Preferably, the first and second members 114 and 116 are first and second segments of a gas turbine combustor casing.

The seal 10 includes a flexible and generally imperforate metal sheet assemblage 120 having opposing first and second surfaces 122 and 124 and two opposing raised edges 126 and 128 connecting together the first and second surfaces 122 and 124. Each of the raised edges 126 and 128 extends a generally identical distance above the first surface 122, and each of the raised edges 126 and 128 extends generally that same identical distance below the second surface 124. It is noted that the directions "above" and "below" are relative directions applying to the seal 110 as viewed in FIGS. 1 and 2. Preferably, the raised edges 126 and 128 are generally mirror images of each other. The metal sheet assemblage 120 comprises at least one metal sheet 130 (as shown in FIG.

2). The metal sheet assemblage 120 may comprise at least two superimposed and preferably identical metal sheets (not shown) having staggered slots for added flexibility. Although not shown in the figures, one raised edge of the metal sheet assemblage may be formed entirely from one of the edges of one metal sheet, and the other raised edge of the metal sheet assemblage may be formed entirely from one of the edges of another metal sheet. The metal sheet assemblage 120 is generally impervious to gas and comprises (and preferably consists essentially of) metal, ceramic, and/or polymer. The choice of materials for the metal sheet 130 and the choice of the thickness for the metal sheet 130 are made by the artisan to meet the sealing and flexibility requirements of a particular seal application. Preferably, the metal sheet assemblage 120 has no more than four metal sheets. Preferably, the metal sheet assemblage 120 has a thickness of generally between five and ten thousandths of an inch, and each metal sheet comprises a high-temperature, cobalt-based super-alloy, such as Inconel 750 or HS188. It is noted that the metal sheets can comprise different materials and/or have different thicknesses depending on the particular seal application. Preferably, the metal sheet 130 consists essentially of Inconel 750 or HS188. It is further noted that many gas-turbine seal applications (such as between combustor casing segments) will require a curved metal sheet assemblage 120.

The seal 110 also includes a first cloth layer assemblage 132 having a thickness generally equal to the previously defined identical distance (i.e., the identical distance the first and second raised edges 126 and 128 extend above the first surface 122) and superimposed on the first surface 122 between the raised edges 126 and 128. The seal 110 additionally includes a second cloth layer assemblage 134 generally identical to the first cloth layer assemblage 132 and superimposed on the second surface 124 between the raised edges 126 and 128. The first cloth layer assemblage 132 comprises a cloth layer 136 (as shown in FIG. 2). The first cloth layer assemblage 132 may comprise at least two overlying cloth layers (not shown). The cloth layer 136 comprises (and preferably consists essentially of) metal, ceramic, and/or polymer fibers which have been woven, knitted, or pressed into a layer of fabric. The choice of layer construction (i.e., woven, knitted, or pressed), the choice of materials for the cloth, and the choice of the thickness for a layer are made by the artisan to meet the wear resistance, flexibility, and sealing requirements of a particular seal application. Preferably, the first cloth layer assemblage 132 has no more than two cloth layers. It is noted that such multiple cloth layers can comprise different materials, different layer construction (i.e., woven, knitted, or pressed) and/or have different thicknesses depending on the particular seal application. Preferably, each cloth layer is a woven cloth layer comprising, and preferably consisting essentially of, L605 or Haynes-25. An exemplary cloth layer is a twilled metal cloth layer. By "twilled" is meant a cloth having a twill weave (such as a twill weave which floats weft threads over two warp threads and which staggers these floats regularly). In a first preferred construction, the cloth layer has 30 warp wires per inch and 250 weft wires per inch with each warp and weft wire having a thickness of 7 mils and with the cloth layer having an overall thickness of 0.027 inch. In a second preferred construction, the cloth layer has 20 warp wires per inch and 250 weft wires per inch with each warp wire having a thickness of 10 mils and each weft wire having a thickness of 8 mils and with the cloth layer having an overall thickness of 0.025 inch. Preferably, the twill weave is a Dutch Twill weave.

Preferably, the first cloth layer assemblage 132 is superimposed on generally the entire first surface 122, the second cloth layer assemblage 134 is separate from the first cloth layer assemblage 132, and the second cloth layer assemblage 134 is superinmposed on generally the entire second surface 124. In a preferred construction, the first and second cloth layer assemblages 132 and 134 and the metal sheet assemblage 120 are attached together by a plurality of spot welds 138 (as shown in FIGS. 1 and 2). In another preferred construction, seam welds (not shown) are used in place of spot welds.

In an exemplary seal installation, the first member 114 of the gas turbine 118 has a first surface 140 with a first slot 142, and the second member 116 of the gas turbine 118 has a second surface 144 with a second slot 146 generally opposing the first slot 142. The gas-path leakage seal 110 is disposed partially in the first slot 142 and partially in the second slot 146 with one of the raised edges 126 disposed entirely within the first slot 142 and the other of the raised edges 128 disposed entirely within the second slot 146. The gas-path leakage-gap 112 has a higher-pressure end 148 and a lower-pressure end 150. This pressure differential seats the seal 110 such that the raised edges 126 and 128 resiliently and unattachedly contact the first and second members 114 and 116 respectively along the lower pressure side of the respective first and second slots 142 and 146 and such that the second cloth layer assemblage 134 also unattachedly contacts the first and second members 114 and 116 along the lower pressure side of the first and second slots 142 and 146. The resilient contact of the metal sheet assemblage 120 maintains sealing in the "plane" of the seal 110 while allowing for different surface shapes, assembly misalignment, vibration, and/or thermally-induced relative movement between the first and second members 114 and 116. The first and second cloth layer assemblages 132 and 134 protect the metal sheet assemblage 120 against wear. The unique design of the raised edges 126 and 128 allows the seal 110 to be installed right-side up or upside down in that the same resilient sealing contact of the raised edges 126 and 128 with the first and second members 114 and 116 occurs whether the second cloth layer assemblage 134 is pushed by the differential pressure into contact with the first and second members 114 and 116 (as shown in FIG. 2) or whether, with the seal installed upside down (not shown), the first cloth layer assemblage 132 is pushed by the differential pressure into contact with the first and second members 14 and 116. The installed seal 110 is not welded or otherwise attached to the first and/or second members 126 and 128 allowing for ease of installation. During a large lateral offset movement (not shown in the figures) of the first and second members 114 and 116, the first portion of one of the raised edges will contact the high pressure side of one of the slots and the second portion of the other of the raised edges will contact the low pressure side of the other of the slots to maintain sealing, as can be appreciated by those skilled in the art.

In the first preferred embodiment, the metal sheet assemblage 120 is an elongated metal strip assemblage having a centerline 152 running midway between the raised edges 126 and 128 and having a cross section (shown in FIG. 2) generally perpendicular to the centerline 152. Here, each of the raised edges 126 and 128 has a first portion 154 disposed at the previously-defined identical distance above the first surface 122 of the metal sheet assemblage 120, each of the raised edges 126 and 128 has a second portion 156 disposed at the previously-defined identical distance below the second surface 124, and in the previously-defined cross section the first portion 154 has a curved shape. Also, in the previously-defined cross-section the raised edges 126 and 128 each terminate proximate the second portion 156. Furthermore, each of the raised edges 126 and 128 has a connecting portion 158 joining together the first and second portions 154 and 156, and in the previously-defined cross section the connecting portion 158 has a curved shape. Preferably, in the previously-defined cross section the connecting portions 158 have a generally bullet-nosed shape pointing away from each other. Such curved bullet-nosed shape facilitates seal installation in many seal applications.

FIGS. 3 and 4 schematically show a second preferred embodiment of the gas-path leakage seal 210 of the present invention. Seal 210 is identical to seal 110 of the previously-described first preferred embodiment with differences as hereinafter noted. In seal 210, the connecting portion 258 joining together the first and second portions 254 and 256 of each of the raised edges 226 and 228, in the previously-defined cross section, has a generally straight shape.

A third preferred embodiment of the seal 310 of the present invention is schematically shown in FIG. 5. Seal 310 is identical to seal 110 of the previously-described first preferred embodiment with differences as hereinafter noted. With seal 310, in the previously-defined cross section, the second portion 356 has a curved shape, and the raised edges 326 and 328 each terminate proximate the second surface 324 of the metal sheet assemblage 320.

In a preferred mode of making the seal 110, 210, and 310, a sheet metal member is stamped or rolled to form the curved raised edges 126, 226, & 326 and 128, 228, & 328. It is noted that seal 110 can be made by pressing seal 210 between two pressing plates (not shown).

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A gas-path leakage seal for generally sealing a gas-path leakage-gap between spaced-apart first and second members of a turbine, said seal comprising:
    a) a flexible and generally imperforate metal sheet assemblage having opposing first and second surfaces and having two opposing raised edge regions and two opposing unraised edges, said unraised edges connecting together said first and second surfaces, and said raised edge regions and said unraised edges defining generally the perimeter of said metal sheet assemblage, wherein each of said raised edge regions extends a generally identical distance above said first surface, and wherein each of said raised edge regions extends generally said identical distance below said second surface;
    b) a first cloth layer assemblage having a thickness generally equal to said identical distance and superimposed on said first surface between said raised edge regions; and
    c) a second cloth layer assemblage generally identical to, and a separate piece from, said first cloth layer assemblage and superimposed on said second surface between said raised edge regions.

2. The seal of claim 1, wherein said first cloth layer assemblage is superimposed on generally the entire first surface and wherein said second cloth layer assemblage is separate from said first cloth layer assemblage and is superimposed on generally the entire second surface.

3. The seal of claim 1, wherein said first and second cloth layer assemblages and said metal sheet assemblage are attached together by a plurality of spot welds.

4. The seal of claim 1, wherein said raised edge regions are generally mirror images of each other.

5. The seal of claim 1, wherein said metal sheet assemblage is an elongated metal strip assemblage having a centerline running midway between said raised edge regions and having a cross section generally perpendicular to said centerline, wherein each of said raised edge regions has a first portion disposed at said identical distance above said first surface, wherein each of said raised edge regions has a second portion disposed at said identical distance below said second surface, and wherein in said cross section said first portion has a curved shape.

6. The seal of claim 5, wherein in said cross section said raised edge regions each terminate proximate said second portion.

7. The seal of claim 5, wherein in said cross section said second portion has a curved shape and wherein said raised edge regions each terminate proximate said second surface.

8. The seal of claim 5, wherein each of said raised edge regions has a connecting portion joining together said first and second portions, and wherein in said cross section said connecting portion has a curved shape.

9. The seal of claim 8, wherein in said cross section said connecting portions have a generally bullet-nosed shape pointing away from each other.

10. The seal of claim 5, wherein each of said raised edge regions has a connecting portion joining together said first and second portions, and wherein in said cross section said connecting portion has a generally straight shape.

11. A turbine seal assembly comprising:
    a) a first turbine member having a first surface with a first slot;
    b) a second turbine member spaced-apart from said first turbine member so as to define a gas-path leakage-gap therebetween, said second turbine member having a second surface with a second slot generally opposing said first slot; and
    c) a gas-path leakage seal for generally sealing said gas-path leakage-gap, wherein said seal is disposed partially in said first slot and partially in said second slot, and wherein said seal includes:
        (1) a flexible and generally imperforate metal sheet assemblage having opposing first and second surfaces and having two opposing raised edge regions and two opposing unraised edges, said unraised edges connecting together said first and second surfaces, and said raised edge regions and said unraised edges defining generally the perimeter of said metal sheet assemblage, wherein each of said raised edge regions extends a generally identical distance above said first surface, wherein each of said raised edge regions extends generally said identical distance below said second surface, wherein one of said raised edge regions is disposed entirely within said first slot, and wherein the other of said raised edge regions is disposed entirely within said second slot;
        (2) a first cloth layer assemblage having a thickness generally equal to said identical distance and superimposed on said first surface between said raised edge regions; and
        (3) a second cloth layer assemblage generally identical to, and a separate piece from, said first cloth layer assemblage and superimposed on said second surface between said raised edge regions.

* * * * *